March 4, 1941.  A. G. F. KUROWSKI  2,233,949

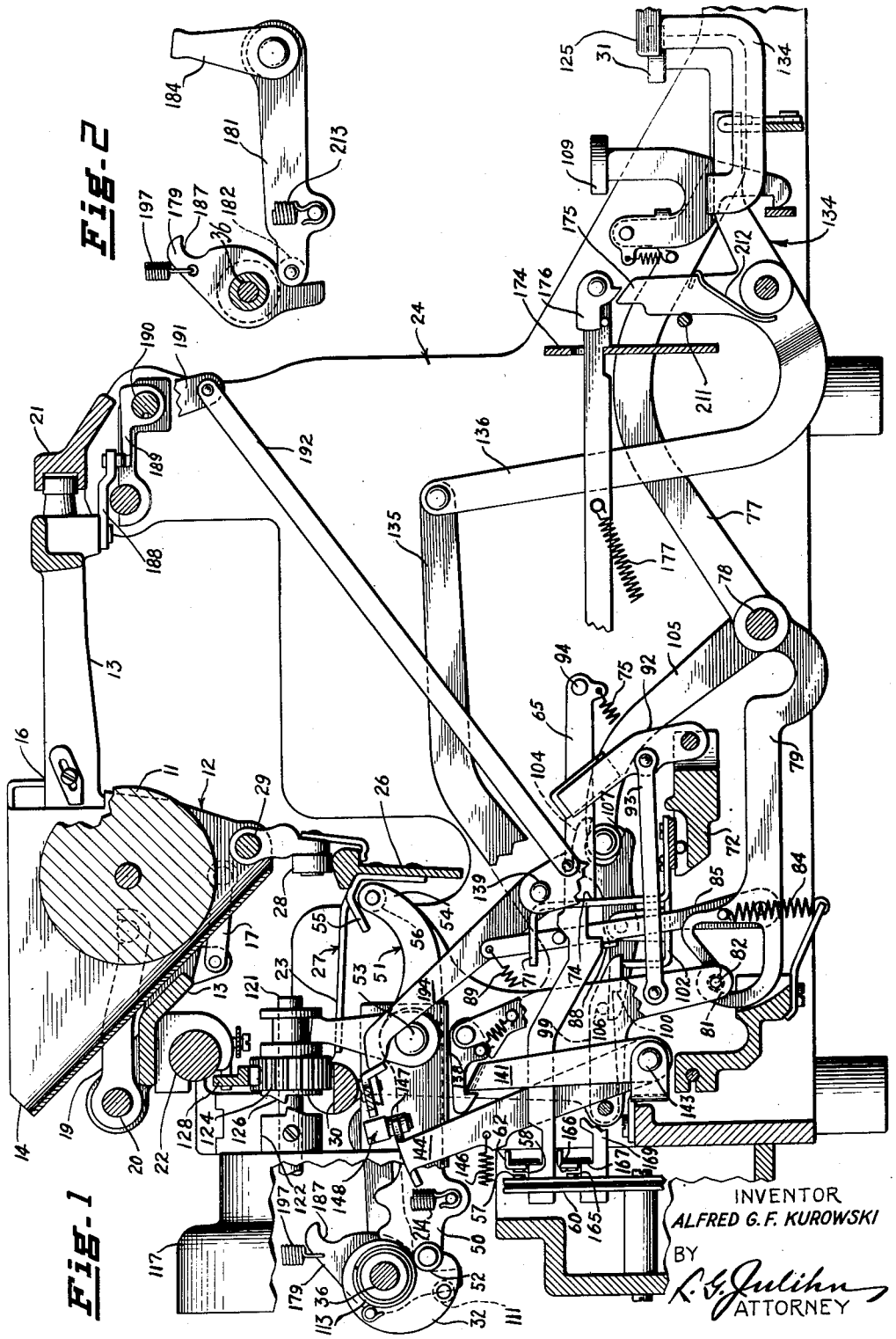

TYPEWRITING MACHINE

Filed March 25, 1939  5 Sheets-Sheet 2

INVENTOR
ALFRED G. F. KUROWSKI
BY
L. G. Julihn
ATTORNEY

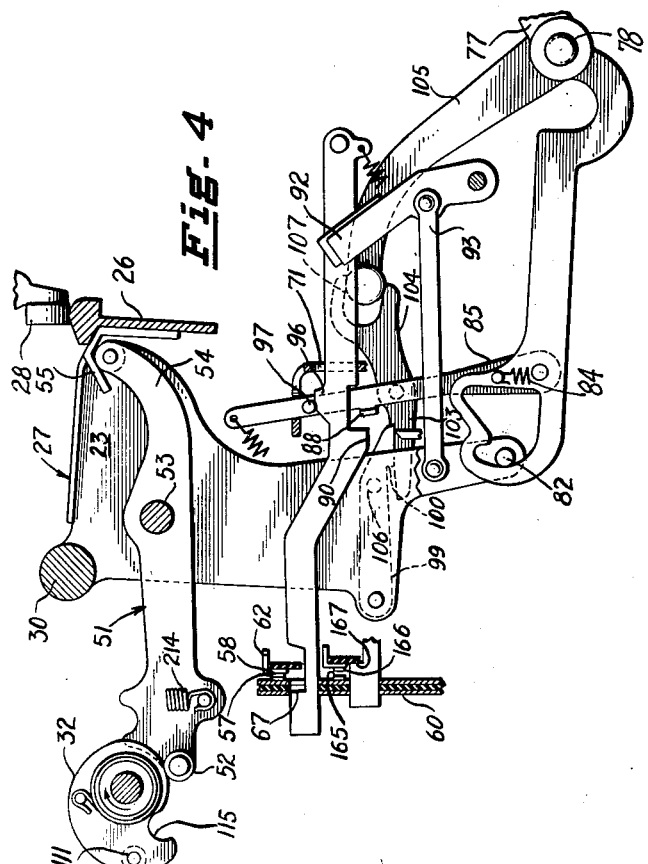
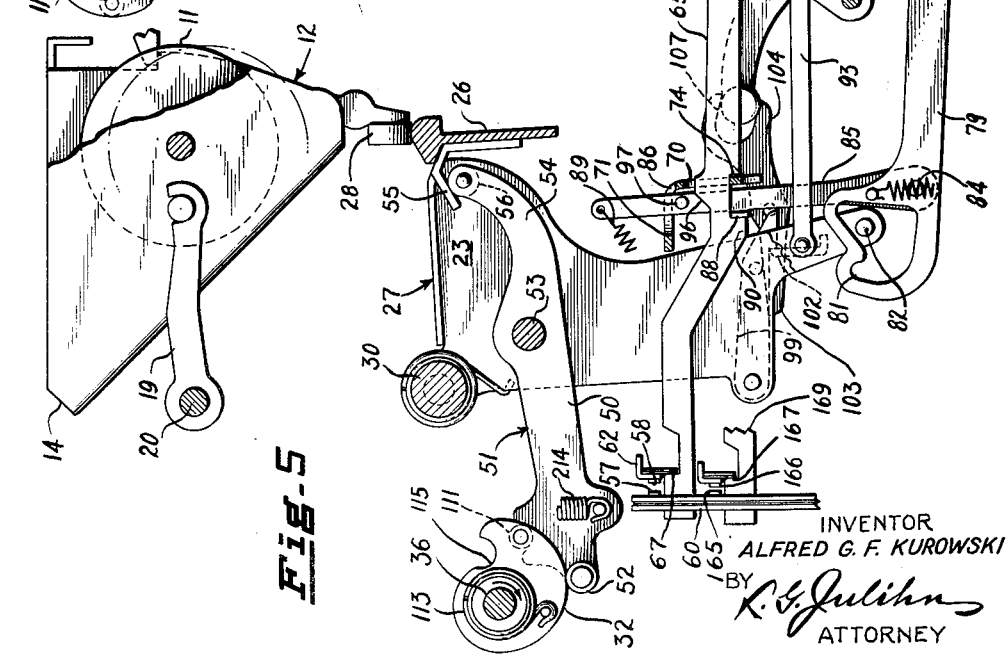
Fig. 4
Fig. 5
INVENTOR
ALFRED G. F. KUROWSKI
BY
ATTORNEY

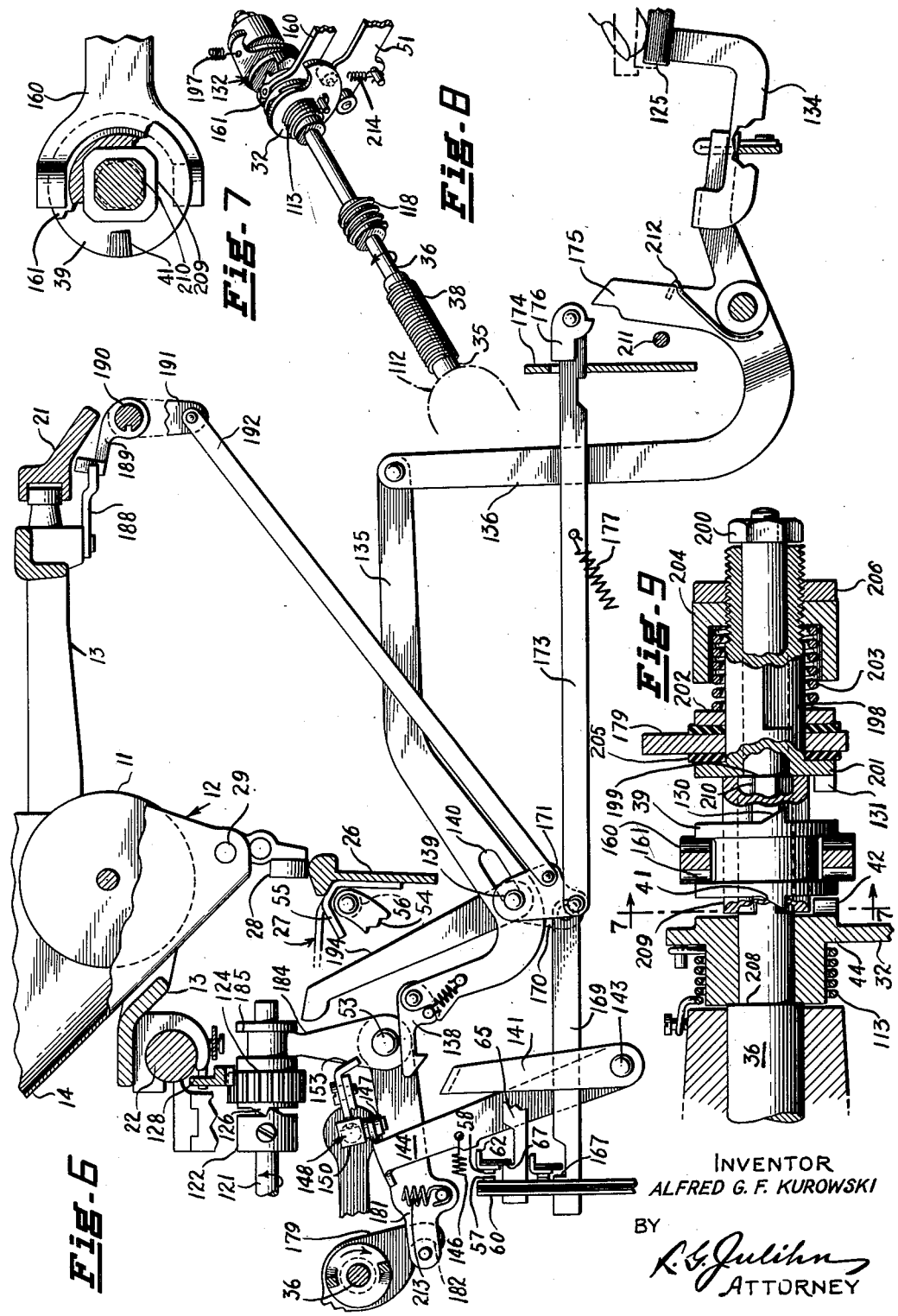

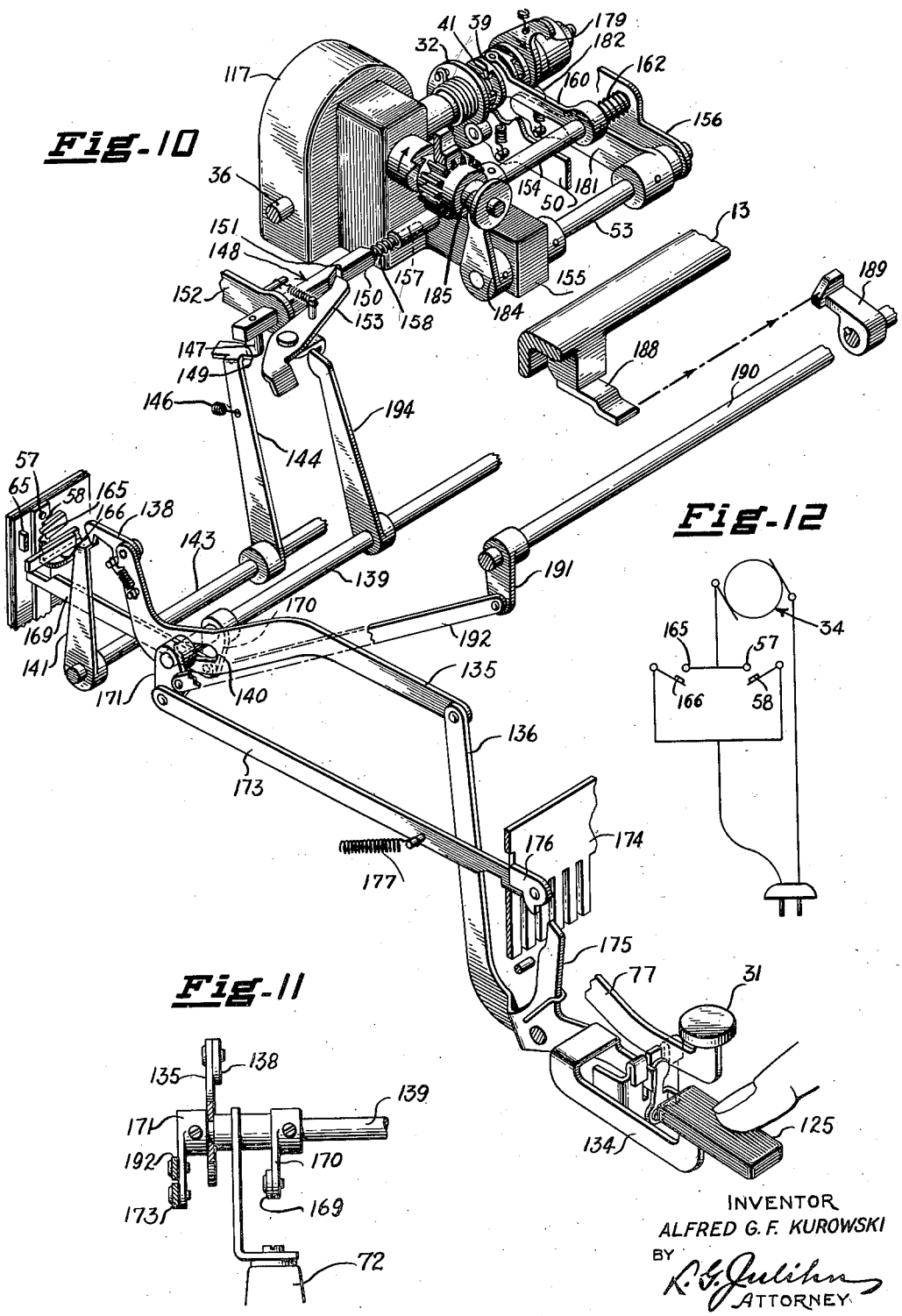

Patented Mar. 4, 1941

2,233,949

UNITED STATES PATENT OFFICE 2,233,949

TYPEWRITING MACHINE

Alfred G. F. Kurowski, Brooklyn, N. Y., assignor to Underwood Elliott Fisher Company, New York, N. Y., a corporation of Delaware Application March 25, 1939, Serial No. 264,094

14 Claims. (Cl. 197—66)

This invention relates to typewriters and more particularly to motor driven carriage-return and case-shifting mechanism therefor.

The main object of the invention is to provide, for use with an intermittently energized electric motor, reliably working, quickly responding, simple and efficient power-case-shifting and carriage-returning devices.

The invention in the preferred form herein shown provides a normally closed operating train from the electric motor to a case-shifting body. The mere operation of a case-shift key causes the closure of the motor circuit and results directly in a case-shift body movement to operated position. The invention provides means whereby the motor is automatically deenergized independently of continued case-shift-key depression by the movement of the case-shift body to shifted position.

A latch controlled by the case-shift key is automatically operative to retain the case-shift body in case-shifted position for the duration of the case-shift-key depression. The drive train to the case-shift body, in the embodiment of the invention shown, is automatically spring-returned to normal position immediately after the motor circuit is deenergized. The return of the case-shift body only occurs when the operator allows the case-shift key to return to normal position.

A shock-absorbing spring interposed in the motor drive provides the spring power to return the case-shift actuator to normal position following an actuation of the case-shift body by power. The electric motor stores in this spring power acting energy whenever the motor reversely drives the case-shift body or the carriage. This stored-up energy is automatically liberated by the deenergization of the motor and results in sufficient reverse rotation of the armature to reversely drive the case-shift actuator to normal position.

Operation of a carriage-return control member or key causes the severing of said normally established case-shift drive-train, energization of the motor, and the closing of a normally open carriage-return transmission. This condition prevails during the entire return of the carriage to a predetermined return-position, whereafter the parts are automatically restored to normal position, so that again the mere closure of the motor-circuit in response to a case-shift-key depression will cause the body to be shifted by power.

In the accompanying drawings:

Figure 1 is a view in side elevation of an "Underwood" typewriter incorporating the mechanisms and controls to power-case-shift the platen and to power-return the carriage, all parts being shown in normal or rest position.

Figure 2 is a detail side view of a carriage-return-clutch operator-cam and the clutch-shifting mechanism operated thereby.

Figure 4 is a view in side elevation showing the power-case-shift mechanism conditioned by the depression of a case-shift key for an actuation of the case-shift cam by the motor.

Figure 5 is a view in side elevation showing the case-shift cam motor moved to operated position but being ready to recede to normal position, the case-shift body or frame having been latched in upper case-position pending the release of the depressed case-shift key.

Figure 6 is a fractional view in side elevation, the carriage-return clutch having been closed by the initial rotation of the motor and being held closed for the duration of the carriage-return.

Figure 7 shows details of a clutch mechanism.

Figure 8 is a fractional perspective view of the motor drive including the clutch mechanism shown in Figure 7.

Figure 9 is a view in sectional front elevation of the clutch shown in Figure 8.

Figure 10 is a fractional perspective view showing the carriage-return key operated and the carriage-return clutch-operator being motor-operated to connect the carriage to the motor.

Figure 11 is a front view of some of the parts of the carriage-return control-mechanism.

Figure 12 is a diagram of the motor-circuit.

Figure 3:
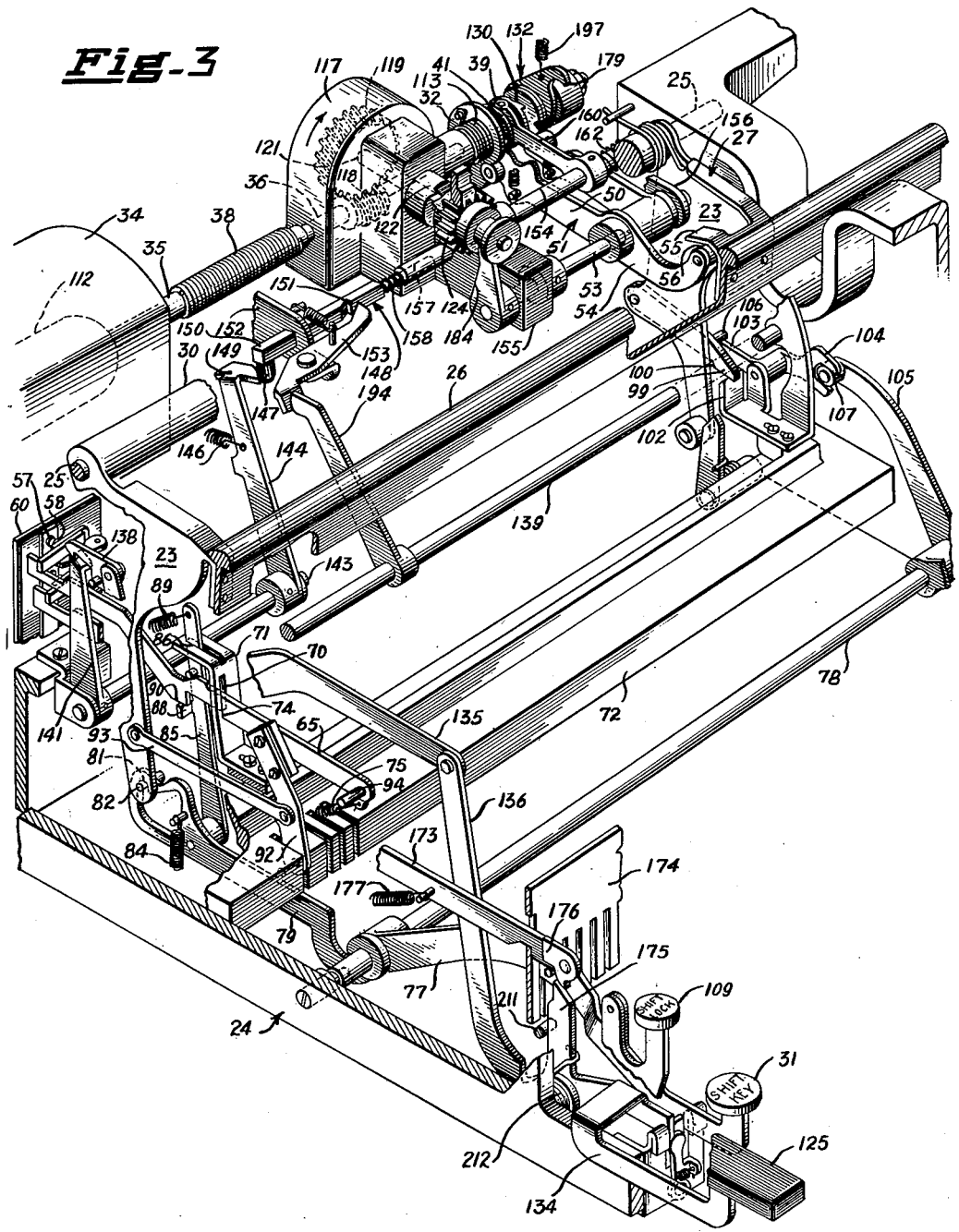
Figure 3 is a fractional front perspective view of the power carriage-return and case-shift mechanism shown in Figure 1.

A platen 11 is supported upon a platen-frame 12 for case-shifting movements within a carriage-frame 13. The platen-frame 12 is normally in a lower-case position so that the side-plates 14 thereof rest upon the ends of the carriage frame as at 16, Figure 1. The usual "Underwood" platen-frame guide-links 17 and the guide-arms 19, which arms are connected by a rock-shaft 20, insure proper guidance of the platen-frame within the carriage-frame 13 from a lower-case position seen at Figure 1 to an upper case position seen at Figure 5, or vice versa. The carriage-frame travels in letter-feed and return directions upon a front-rail 21 and the rear-rail 22, secured upon the main typewriter frame 24. A case-shift rail 26 forms part of a rocking frame 27 having left and right side-pieces 23 and a rear tie-rod 30. The rocking frame 27 is displaceable about rear pivot-studs 25 for raising the case-shift rail 26 to case-shift the platen-frame 12 within the said carriage-frame 13. A roller 28 supported on a cross-rod structure 29 of the platen-frame 12 normally overlies idly the case-shift rail 26. The platen-frame 12 is raised to case-shifted position whenever the roller 28 is raised by an upward displacement of the rail 26, as seen in Figure 5.

The invention provides that the case shift-rail 26 be power-shifted to thereby case-shift the platen 11 from a lower-case position to an upper-case position by the mere closure of the motor circuit in response to an actuation of either a right or left hand case-shift key 31 in the typewriter keyboard. A case-shift actuator 32, in the form of a spiral-shaped cam, occupies normally the idle position seen at Figure 1 and an electric motor 34 is also normally idle. A normally established drive train from the motor to the actuator-cam 32 includes a motor-shaft 35, a motor-driven shaft 36, a motion-transmitting spring 38 interposed between the shafts 35 and 36, and a shiftable clutch-member 39 splined to the motor-driven shaft 36 to rotate therewith. The shiftable clutch member 39 has teeth 41 normally in driving alignment with companion clutch-teeth 42 provided upon a collar 44 of the case-shift actuator-cam 32. The case-shift operating train is therefore normally conditioned to transmit motion from the motor 34 to the case-shift actuator-cam 32 when merely the motor-circuit is closed in response to a case-shift key actuation. The case-shift actuator 32 is loosely mounted upon the motor-driven shaft 36. A rearwardly extending arm 50 of a lever 51, see Figures 3 and 5, carries a roller 52 that normally bears upwardly against the low portion of the actuating cam 32. The lever 51 is mounted for pivotal movement upon a shaft 53 and a forwardly extending arm 54 thereof has a roll 56 underlying a ledge 55 integral with the right-hand side piece 23 of the case-shift rail frame 27. The case-shift actuator or cam 32 is power-rotated in clockwise direction by the motor from a position seen in Figure 1 to the position seen in Figure 5 whenever the motor-circuit is closed in consequence of a case-shift key operation. The operating cam thus imparts a downward motion to the roll 52 and the lever-arm 50 so that the roll 56 on the lever-arm 54 lifts the shift-rail to the Figure 5 position. Latch means associated with the shift-keys 31 and the rocking frame 27 are automatically effective to retain the rocking frame 27 in case-shifted position pending the release of the operated case-shift key by the operator. The case-shift actuator cam 32, however, automatically reverses its rotation simultaneously with the arrival of the rocking-frame 27 at the operated position. This reversal occurs in consequence of an automatic motor-circuit interruption when the case-shift rail-frame 26, 27 approaches the fully operated case-shifted position seen in Figure 5, as will be explained in detail hereinafter.

The motor circuit includes a pair of normally open contacts 57 and 58. One of these contacts, namely, contact 58, is movably mounted and associated with both case-shift keys 31 to be moved against the other contact 57 at each downward case-shift-key operation, to close the motor circuit. The contact 57 is secured to and properly insulated from a bracket-plate 60. The contact 58 is secured upon a pivoted, rearwardly spring-pressed arm 62, which is insulated from the plate 60. A normally latched slide-member 65 has a shoulder 67 engaging an insulated ear on the pivoted contact-arm 62 and thereby normally holds the contact 58 separated from the contact 57. The slide 65 extends forwardly from the contact 62 and its front is guided in a slot 70 of a bracket 71 secured to a transverse portion 72 of the machine frame 24. The rear end of the slide 65 is guided in a slot of the bracket plate 60. A slide latching shoulder 74 lies normally in front of the bracket 71, below the bottom edge of the bracket-slot 70, and is thereby normally retained in a forward open-contact position against the tension of a spring 75. The spring 75 exerts its tension upon the forward end of the slide 65 to pull it downwardly and rearwardly. The left and right hand shift-keys 31 are each mounted upon forward ends of levers 77 and these levers are fixed to a transverse rock-shaft 78. An arm 79 secured to the rock-shaft 78 near its left-end extends rearwardly therefrom and has a hook formation 81 that lies normally in front of a pin 82 provided on a downwardly extending leg of the left rock-frame end-plate 23. The rock-frame 27 is thus normally locked in normal lower-case position as seen in Figures 1 and 3. The shift-keys 31, the shaft 78 and the rearwardly extending arm 79 in effect form a structure that pivots about the axis of the shaft 78. A spring 84 attached to the rear end of the arm 79 retains the structure 31, 78 and 79 yieldingly in the normal Figure 1 position. An upstanding link 85 pivoted to the rear end of the arm 79 protrudes upwardly through a slot 86 in a horizontal rearward branch of the bracket 71. The link 85 leans normally rearwardly against the rearward end of the slot 86 under the action of a spring 89. An ear 88 extending laterally from the link 85 underlies normally a heel 90 on the contact controlling slide 65. The rearwardly extending arm 79 is lifted upwardly at each depression of a shift key 31, so that the hook 81 frees the pin 82, see Figure 4, to allow the rocking frame 27 to be subsequently moved to case-shifted position. The link 85 being attached to the arm 79 also moves upwardly and the ear 88 thereon will have risen far enough at the end of the case-shift key depression to release the shoulder 74 of the slide 65 from the lower edge of the bracket slot 70. The slide 65 being urged by the spring 75, thereupon immediately moves rearwardly and causes the contact 58 to move against the associate contact 57 to the closed-circuit position seen in Figure 4.

As stated hereinbefore, the motor-circuit is automatically opened when the rocking-frame 27 and, therefore, also the platen 11, approaches fully operated position. Connections operated by the case-shift movement of the rock-frame 27 restore the link 65 to circuit-opening position. These connections include an arm 92 pivoted upon the transverse frame-portion 72 and a link 93, operatively connecting the arm 92 to the lower end of the rock frame 27. The outer end of the arm 92 occupies normally a position well in back of a pin 94 on the slide 65. The link 93 is attached to the arm 92 near its pivot, whereby the upper-end of the arm will receive a multiplied movement when actuated. The greater part of the arm-motion is idle so that the slide-member 65 will only be engaged and moved to contact-opening position when the rocking-frame 27 has nearly completed its power case-shift motion. In Figure 5, the rock-frame 27 has fully arrived in case-shifted position and the contacts 57 and 58 have been separated by the last part of the multiplied motion transmitted from the arm 92. The slide-shoulder 74 is seen in this Figure 5 position as having been moved by the combined action of the arm 92 and the spring 75 slightly in front of the bracket 71 below the bottom-end of the slot 70. The slide 65 has a notch forward of the heel 90 to permit the above explained downward latching movement of the slide-shoulder 74 in case the case-shift key is held depressed. The link-ear 88 previously enters the slide-notch during the rearward contact-closing slide motion, as seen in Figure 4, and the slot 86 extends forwardly far enough to allow the link 85 to swing forwardly when the slide 65 is being relatched forwardly as seen in Figure 5. In the position of the parts as seen in Figure 4, a raised portion 96 on the slide 65 lies directly under a pin 97 on the link 85. In no event, therefore, can the arm 79 drop to normal position before the rock-frame 27 has partly case-shifted, i.e. before the pin 82 thereon has passed the arm-hook 81.

As has been stated, the motor-actuated cam 32 rotates in consequence of a case-shift-key depression, first in one direction, and then in the opposite direction. An arm 99, loosely pivoted to the right hand side-piece 23 of the rock-frame 27, has a latch-shoulder 100 which drops over the front edge of a bracket 102 when the rock-frame arrives in case-shifted position. As seen in Figure 3, a lever 104 pivoted upon the bracket 102 has a rearward arm 103 underlying a pin 106 extending laterally from the latch arm 99. A rearwardly extending arm 105, secured to the shift-key operable rock-shaft 78, is articulated as at 107 to a forward end of the lever 104. The rearward arm 103 of the lever 104, therefore, descends at the depression of either shift key 31, and thus allows the latch 100 to drop over the edge of the bracket 102 to detain the rock-frame 27 in case-shifted position pending release of the shift key. At the release of the shift key, the arm 103 will rise to lift the latch 100 from the front edge of the bracket 102, whereby, the rocking frame 27 drops back to normal-case position. The weight of the rock-frame 27 and the platen-frame 12 seated thereupon is sufficient to restore the motor shifted parts to normal-case position.

Each shift-key lever 77 may also be operated by a shift-lock key 109. A shift-key lever 77 when so operated will remain in operated position until the operator strikes and releases one of the regular shift keys 31.

The yield of the spring 38 eliminates objectionable noise and shock at the beginning and also at the end of the power-case-shift operation. In transmitting motion to the case-shiftable parts, the spring 38 is tensioned a fraction of a turn. The motor-circuit opens automatically just before the parts have fully arrived in case-shifted position. The actuator-cam 32 and the driving train, however, continue by momentum until in fully operated position a pin 111 on the cam 32 finally engages the rear-arm 50 of the lever 51, as seen in Figure 5. The transmission spring 38 uncoils automatically after the platen 11 arrives in fully operated position and drives the motor-armature or rotor 112 in reverse direction, the abutment of the pin 111 reacting against the arm 50 preventing further forward rotation of the cam-end of the drive. The momentum attained by the armature 112 in rotating backwards carries the armature 112 far enough to cause the actuator 32 to return to normal position by the aid of an actuator-returning spring 113 that is coiled about a collar 44 of the actuator. See Figure 1. A seat 115 on the actuator-cam 32 gages the cam in normal position against the arm-roller 52. The companion clutch teeth 41 and 42 are of a form to allow unlimited reverse rotation of the clutch member 39. The driven-shaft 36 is rotatively supported in the side walls of a worm-gear housing 117, and a worm 118, fastened upon the shaft, is endwise confined within the housing. A worm-gear 119 meshes with the worm 118 and is secured upon the rear-end of a horizontal shaft 121 rotatively mounted in the gear housing 117. A collar 122 having clutch-teeth is mounted upon the gear-shaft 121 forward of the gear housing and is adapted to drive a carriage-return pinion 124, following each depression of the carriage return key 125. The pinion 124 is loosely mounted upon the shaft, both rotatively and slidably, and clutch teeth 126 thereon face the teeth on the collar 122, but are normally out of driving range thereof. The pinion 124 is in constant mesh with a carriage-return and line-spacing rack 128 that is slidably mounted upon the carriage-frame 13. The above described carriage-return drive agrees substantially with the one disclosed in the Helmond Patent No. 1,835,776 of December 8, 1931.

The organization whereby a motor-driven carriage-return operation may be obtained at the depression of the carriage-return key 125 will now be described. The clutch member 39 is normally held in a lateral position so that upon motor-energization, the teeth 41 thereon will transmit motion to the case-shift actuator-cam 32. Other clutch teeth 130 projecting from the right side of the clutch member 39 are normally out of driving alignment with teeth 131 extending from a carriage-return clutch-operator 132. The clutch-member 39 is shifted laterally out of normal driving alignment with the clutch teeth 42 of the cam 32 into driving alignment with the clutch teeth 131 of the carriage-return drive-controller, at each depression of the carriage-return key 125. The carriage-return key 125 surmounts a forwardly extending arm of a three-armed pivoted lever 134. A rearwardly extending link 135 pivotally secured to the upper end of a long rearwardly and upwardly extending arm 136 carries at its rear end a pivoted downwardly springpressed hook-shaped arm 138. The link 135 is loosely guided at its rear upon a shaft 139 by means of a slot 140 provided therein. The hook of the arm 138 lies normally slightly in the rear of an upright arm 141 secured at its bottom to a rock-shaft 143. See Figure 3. The shaft 143 is rockably mounted upon brackets secured to the machine framework and has secured to it to the right of the arm 141 another upstanding arm 144. A spring 146 pulls the arm 144 rearwardly to a gaged position against the machine framework. A roller 147 carried by the left end of a laterally extending slide rod 148 lies normally against the front end of a horizontal cam-figure 149 provided upon the arm 144 and is moved thereby toward the right at each depression of the carriage-return key 125. The slide rod 148 comprises a square-sectioned portion 150 and a rightward continuation 154. The continuation is slidably supported near one end in a boss 155 of the gear-housing 117 and near the other end in a bracket plate 156. The square-sectioned portion 150 is at its right supported in a square hole of a bracket 152 and has a socket-support in the rod continuation 154 at 157. A spring 158 provides a resilient axial connection between the rod-portions 150 and 154. The rod continuation 154 has fastened thereto an arm 160 having a forked rear end extending into a groove 161 of the shiftable clutch-member 39. See Figure 9. A compression spring 162 provided upon the rod portion 154 normally holds the composite rod 148, including the arm 160, in a leftward position, so that the clutch teeth 41 and 42 are normally in driving alignment for a power case-shift operation. At the depression of the carriage-return key 125, however, the rod portion 154 is moved by the square rod portion 150 towards the right by the connections just described, whereby the teeth 130 of the clutch member 39 will be resiliently shifted into driving alignment with the clutch teeth 131 on the carriage-return drive controller 132. The cam-finger 149 and its operating connections described provide for a rightward movement of the rod portions 150 and 154 at the very beginning of the downward movement of the carriage-return key 125, the spring 158 allowing the movement of the rod portion 154 to be delayed in case the clutch teeth 130 and 131 meet point to point. A spring-urged latch 153 pivotally supported upon the bracket 152 automatically enters a notch 151 provided in the rod 150 to thereby hold the rod in operated position for the duration of the carriage return operation, independent of the release of the carriage-return key 125.

The cam arm 144 and the arm 141 are shown in Figures 6 and 10 as having been returned to normal Figure 1 position by a spring 146 despite continued carriage-return-key depression. This condition has been arrived at by the passage, during its operation, of the hook 138 over the upper edge of the arm 141. The thus effected immediate return of the cam-arm 144 facilitates the restoration of the shifting rod 148 to normal position independent of the release of the carriage-return key 125 at the conclusion of the carriage-return operation when the latch 153 will be released in a manner to be explained later.

The carriage-return key 125 is only operative to close the motor circuit at the completion of its downward operation. The drawings illustrate a pair of separate carriage-return contacts 165 and 166. One of these contacts, namely, contact 166, is normally held separated from its companion contact 165 by a shoulder 167 of a link 169 which has its forward end connected to an arm 170 secured to the shaft 139. See Figure 10. Another arm 171 fastened to the shaft 139, rightwardly of the arm 170, has pivotally connected thereto a normally latched link 173 that is urged rearwardly and downwardly by a spring 177. At Figures 1 and 3, the link 173 is seen latched in a forward position over a slot edge of a key lever comb plate 174, and the contact 166 in these figures is correspondingly held separated from the contact 165 by the link shoulder 167. An upright third arm 175 of the carriage-return keylever 134 extends normally upwardly in back of a trip-pawl 176 pivoted on the link 173. The carriage-return key 125 engages the trip-pawl 176 at the last part of its operation to cam it upwardly to thereby free the link 173 from the comb 174 for a rearward contact closing movement by the power of the spring 177, as seen in Figures 6 and 10. The motor so energized by the depression of the carriage-return key 125 drives the collar 122 geared to the worm 118 and also the carriage-return clutch operator 132. A cam-arm 179 frictionally seated upon the controller 132 therefore rotates in clockwise direction from the Figure 2 position to the Figure 6 position and rocks an arm 181 downwardly by engaging a roller 182 thereon. The arm 181 is fixed to the rock-shaft 53 and another arm 184, fastened upon the left end of the shaft 53, extends into a groove 185 of the carriage-return pinion 124. The pinion 124 is normally positioned free of the collar 122, but is connected to the motor-driven collar 122 by the initial rotation of the motor 34 and its continued rotation will drive the carriage 13 toward the right. The cam-arm 179, as hereinbefore stated, is frictionally driven by the clutch-operator 132. The friction is light enough to allow the cam-arm 179 to slip after a seat 187 on the cam-arm engages the roll 182 on the arm 181. See Figure 6 position. The motor 34 continues to drive the carriage 13 until a dog 188 mounted upon the front of the carriage encounters and rocks downwardly a margin-controlling cam 189. The margin-controlling cam 189 is splined for adjustment along a rock-shaft 190 together with an adjustable carriage-return margin regulator of usual design, not shown. A downwardly pending arm 191, secured to the shaft 190 near its left end has a rearwardly extending link-connection 192 with the arm 171. The carriage dog 188, therefore, in encountering the cam 189 imparts a rocking motion to the shaft 191 which is communicated by the link 192 to the contact controlling mechanism, to restore it to the latched, open-contact position seen in Figure 1. An arm 194 secured to the shaft 139 has an upper end normally holding the latch 153 out of the notch 151 on the square rod. The latch 153 is, however, immediately rendered effective upon the operation of the carriage return key by the forward movement that is given to the arm 194 by the release of link 173. When the carriage dog 188 engages the cam 189, the arm 194 is moved rearward and thereby lifts the latch 153 out of the notch 151 and allows a leftward restoration of the composite rod 148 by the spring 162, thus effecting the separation of the teeth 130 and 131 on the clutch-member 39 and the carriage-return clutch operator 132, respectively. Concomitantly, the connection by the teeth 41 and 42 between the actuator and the clutch member 39 is reestablished. A spring 197 attached to the cam-arm 179 at one end and to the framework at the other end rotates the cam 179 to normal Figure 1 position after the completion of each carriage-return. The endwise separation of the teeth 130 and 131 is facilitated by a backward rotation of the armature 112 under the action of the transmission spring 38.

The carriage-return drive-controller 132 is in the form of a unitary assembly, including a normally loose sleeve 198 retained endwise upon the shaft 36 between a shoulder 199 and a nut 200. See Figure 9. The cam-arm 179 is rotatably seated upon the sleeve 198 between a sleeve-flange 201 having clutch teeth 131 and a disk 202. The disk 202 is keyed or splined to the sleeve 198 to rotate therewith. A compression spring 203 is arranged upon the sleeve 198 between the disk 202 and a nut 204 and presses the disk 202 facewise toward the flange 201. Washers 205 of friction material, such as fiber, are loosely interposed to each side of the cam-arm 179 between the flange 201 and the washer 202. The cam-arm is thus seated upon the sleeve assembly to be frictionally rotated with it. The nut 204 is adjustable upon the sleeve 198 for changing the spring tension and is locked in position by a nut 206.

The case-shift operating cam 32 is seated upon the shaft 36 between a shoulder 208 and the left end of a bushing 209 fitting tightly upon a squared portion 210 of the shaft 36. The clutch member 39 is splined to the bushing 209 to be shifted therealong and to be rotated therewith.

It is to be noted from the drawings that, subsequent to each carriage-return key operation, a spring 212 returns the three-armed carriage-return key lever 134 to normal position against a stop pin 211. Furthermore, the clutch teeth 126 on the carriage return pinion 124 are moved away from the teeth of the collar 122 at the end of each power carriage return operation by a spring 213 attached to the arm 181 of the carriage-return clutch-controlling mechanism. A spring 214 attached to the case-shifting arm 50 keeps the roller 52 thereon in constant contact with the surface of the actuator-cam 32.

It is obvious that the invention is not limited to the details and their arrangement shown and that the invention although shown with a case-shiftable platen is likewise applicable to a typewriter with a case-shiftable type-bar segment.

What is claimed is:

1. In a typewriter or the like having a case-shift body mounted for movement to either of two case-positions, in combination, a case-shift key movable from a rest position to an operated position and vice versa, an electric motor including a rotor, a normally open circuit for said motor, a case-shift actuator having an operative connection with the said case-shift body, adapted to be driven by the rotor of the said motor from a normal to an operated position for case-shifting the said body, circuit-closing means operated by the movement of said key to one of the said positions to effect a motor-driven actuator movement for motor-shifting the said body from one to the other case-position, circuit-opening means automatically operative in response to the drive of said actuator, when said body arrives in motor-shifted case-position, means automatically operative to detain the said body in motor-shifted position pending movement of said key from the said one of the said positions to the other position, and spring means tensioned by the said motor in driving said actuator, for reversely driving the said rotor and the actuator in response to the opening of the circuit to restore said actuator to the said normal position.

2. In a typewriter or the like having a case-shift body mounted for movement to and from a case-shifted position, in combination, a case-shift key, an electric motor including a rotor, a normally open circuit for said motor, a rotative case-shift actuator, having an operative connection with the said case-shift body, adapted to be driven by the rotor of the said motor from a normal to an operated position upon motor energization, circuit-controlling mechanism operated in response to each case-shift key depression to effect the energization of the motor to case-shift the said body, means automatically operative in response to the drive of said actuator, when said body arrives in case-shifted position, to operate the said circuit-controlling mechanism to deenergize the motor, means automatically operative to detain the said body in case-shifted position pending release of the case-shift key, and spring means tensioned by the said motor in driving the said actuator, adapted to reversely drive the said rotor and the said actuator in response to the deenergization of the motor, to thereby effect immediate restoration of said actuator to the said normal position following operation.

3. In a typewriter or the like having a case-shift body mounted for movement to and from a case-shifted position, in combination, a case-shift key, an electric motor including a rotor, a normally open circuit for said motor, a case-shift actuator, having an operative connection with the said case-shift body, adapted to be driven by the rotor of the said motor from a normal to an operated position upon motor energization, circuit-controlling mechanism operated in response to each case-shift key depression to effect the energization of the motor to case shift the said body, automatic means to operate the said circuit-controlling mechanism to deenergize the motor when the said body arrives in case-shifted position, means automatically operative to detain the said body in case-shifted position pending case-shift key restoration, and spring means tensioned by the said motor in driving the said actuator, adapted to reversely drive the said rotor and the said actuator to effect immediate restoration of the said actuator to normal position when the motor is deenergized in response to the arrival of the said body in case-shifted position.

4. In a typewriter, having a carriage, and a case-shift body; a normally deenergized electric motor, a normally operative-conditioned actuating train from the motor to said case-shift body, a normally inoperative-conditioned drive-train from the motor to the said carriage, means to effect a temporary energization of the motor for imparting a case-shift movement to the case-shift body by the said normally operative-conditioned train, and means to effect a temporary reversal of the conditions of the said trains and a temporary energization of the motor, to thereby effect a motor-driven movement of the carriage without effecting a case-shift movement.

5. In a typewriter, having a carriage, and a case-shiftable body; a normally deenergized electric motor, a normally operative-conditioned actuating train from the motor to the said case-shift body, a normally inoperative-conditioned drive-train from the motor to the said carriage, means to effect a timed period of energization of the motor to substantially impart a full case-shift movement to the said body, and means to effect a temporary reversal of the said conditions of the said trains and a concomitant energization of the said motor until the carriage has been motor-driven to a predetermined position, said motor being ineffective to impart a case-shift movement to the said body while said actuating-train is reversely conditioned.

6. In a typewriter, having a carriage, and a case-shiftable body; a normally deenergized motor, a case-shift key movable from a rest position, to and from an operated position, a case-shift actuator for case-shifting the said body, movable from a normal position to an operated position, a normally operative-conditioned drive-train from the motor to the said actuator, a normally inoperative-conditioned drive-train from the motor to the said carriage, means rendered operative by the movement of said case-shift key to one position to temporarily energize the motor to cause the said actuator to be moved to operated position, means automatically operative to return the said actuator to normal position after said temporary motor energization, and means to effect a temporary reversal of the conditions of the said trains and a temporary energization of the motor, to thereby effect a motor-driven movement of the carriage without effecting a case-shift movement.

7. In a typewriter having a platen and types movable thereagainst, in combination, an electric motor, a normally open circuit for said motor, a part movable to effect a relative case-shift of said platen and types, a case-shift actuator for said part normally operatively connected with the said motor, a carriage, carriage-return driving mechanism normally disconnected from the said motor, a case-shift key, a carriage return key, means for closing the said motor-circuit in response to a depression of either of said keys, additional means also operated in response to a carriage-return key depression for disconnecting the motor from the said case-shift actuator and for connecting the motor to the carriage-return driving mechanism, whereby upon depression of the case-shift key, the said part is motor-shifted and upon the depression of said carriage-return key the said carriage-return mechanism is motor-driven, and means operated automatically by the case-shift of said part and also by the movement of said carriage to a predetermined return position to open said motor-circuit.

8. In a typewriter having a platen and types movable thereagainst, in combination, an electric motor, a normally open circuit for said motor, a part movable to effect a relative case-shift of said platen and types, a spring returned case-shift actuator for said part normally operatively connected with the said motor, a carriage, carriage-return driving mechanism normally disconnected from the said motor, a case-shift key movable from a normal position to an operated position and vice versa, a carriage-return key, means for closing the said motor-circuit in response to the movement of said case-shift key to one position and also in response to a carriage-return key depression, means additionally operated in response to a carriage-return key depression for disconnecting the said case-shift actuator from the motor and for connecting the said carriage-return driving mechanism to the motor, whereby, the said movement of said case-shift key to the said one position causes a motor-driven case-shift of said part and the depression of said carriage-return key causes a motor-driven carriage-return movement, means operated automatically by the case-shift of said part or by the movement of said carriage to a predetermined return-position to open said motor-circuit, and means additionally operated by the movement of said carriage to the said predetermined returned position to reconnect the case-shift actuator and to disconnect the carriage-return driving mechanism from the motor.

9. In a typewriter having a platen and types movable thereagainst, in combination, an electric motor, a normally open circuit for said motor, a part movable to effect a relative case-shift of said platen and types, a case-shift actuator for said part normally operatively connected with the said motor, a carriage, carriage-return driving mechanism normally disconnected from the said motor, a case-shift key movable from a normal position to an operated position and back, a carriage return key, means for closing the said motor-circuit in response to the movement of said case-shift key to one of the said positions and also in response to a carriage-return key depression, additional means operated in response to a carriage-return-key depression for disconnecting the motor from the said case-shift actuator and for connecting the said motor to the carriage return driving mechanism, whereby, the said movement of said case-shift key to the said one of the said positions causes a motor-driven case-shift of said part and the depression of said carriage-return key causes a motor-driven carriage-return movement without effecting a case-shift movement, means for automatically opening the said circuit by the movement of the said part to case-shifted position or by the movement of said carriage to a predetermined return-position, and means automatically operative to detain said part in motor-shifted position pending movement of the said case-shift key from the said one of the said positions to the other position.

10. In a typewriter or the like having a case-shift body mounted for movement to either of two case-positions, in combination, a case-shift key movable from a rest position to an operated position or vice versa, an electric motor including an armature, a normally open circuit for said motor, a case-shift actuator movable from a normal to an operated position for shifting the said body and being urged toward normal position, a resilient drive-train intermediate the said armature and the said actuator, circuit-closing means operated by the movement of the said key to one of the said positions to effect a motor-driven actuator movement for motor-shifting the said body from one to the other case-position, circuit-opening means automatically operative in response to the movement of said actuator, when said body arrives in motor-shifted position, and means for detaining the said body in motor-shifted position pending movement of the said key from the said one position to the other position, said resilient drive-train storing energy by being flexed during each motor energization and being adapted to expend said energy to reversely rotate the armature upon motor deenergization, said armature attaining sufficient momentum in rotating reversely to rotate the said drive-train backwardly to thereby permit said actuator to return to normal position.

11. In a typewriter or the like, having a case-shift body mounted for movement to either of two case-positions, in combination, a case-shift key movable from a rest position to an operated position and vice versa, an electric motor including a rotor, a normally open circuit for said motor, a cam rotatable by the said rotor from a normal to an operated position, a member operable by the said cam and connected to the said case-shift body, circuit closing means operated by the movement of said key to one of the said positions to effect a motor-driven cam-movement resulting in a case-shift of said body, circuit-opening means automatically operative in response to the rotation of said cam to operated position, means for detaining the said body in motor-shifted position pending movement of said key from the said one of the said positions to the other position, and spring-means tensioned by the said motor in driving said cam adapted to reversely drive said rotor and the said cam for automatically restoring the said cam upon arrival of said body in said other case-position.

12. In a typewriter, having a platen and types movable thereagainst, in combination, an electric motor, a normally open circuit for said motor, a part movable to effect relative case-shift of said platen and types, a spring-returned case-shift actuator for said part, a clutch normally operatively connecting the motor with the actuator, a carriage, a carriage-return drive operable by the said motor, including a normally open clutch, a carriage-return clutch operator, a case-shift key movable from a normal position to an operated position and vice versa, a carriage-return key, means for closing the said motor-circuit in response to the movement of the said case-shift key to one of the said positions and also in response to the carriage-return key depression, means additionally operated in response to a carriage-return key depression for opening the said actuator-clutch and for frictionally connecting the said carriage-return clutch-operator with the motor, whereby the said movement of said shift-key to the said one of the said positions causes a motor-driven case-shift of said part and whereby upon the depression of said carriage-return key the motor is not able to case-shift the said part but drives the carriage by first closing the said carriage-return clutch, means operated automatically by the case-shift of said part and by the movement of said carriage to a predetermined returned position to open the said motor-circuit, and means additionally operated by the movement of said carriage to the said predetermined returned position to cause restoration of said actuator-clutch and the said carriage-return clutch to respectively closed and open position.

13. In a typewriter having a platen and types movable thereagainst, in combination, an electric motor, a circuit for said motor, a part movable to effect a relative case-shift of said platen and said types, a case-shift actuator for said part normally operatively connected with the said motor, a carriage, a carriage-return drive normally disconnected from the said motor, a case-shift key, a carriage-return key, switch-means in said circuit, spring-means urging the said switch-means to closed-circuit condition, means normally holding said switch-means in open-circuit condition in opposition to the said spring-means, means operable by either of said keys to render said holding means ineffective to hold said switch-means in open circuit condition, means additionally operated in response to a carriage-return key depression, for disconnecting the motor from the said case-shift actuator and for connecting the motor to the carriage-return drive, whereby, upon depression of the case-shift key, the said part is motor-shifted and upon the depression of said carriage-return key the said carriage is motor-driven, means to move said switch-means to open-circuit condition and to render said holding means effective to hold said switch-means in open-circuit condition by either the case-shift movement of said part of motor-shifted position or by the movement of said carriage to a predetermined return-position, and means additionally operated by the movement of said carriage to the said predetermined return-position to disconnect said motor from the carriage-return drive and to connect it to the case-shift actuator.

14. In a typewriter or the like, a case-shiftable body, a normally deenergized motor, a normally operative-conditioned drive-train from the motor to the said body, key-means operable to effect a temporary energization of the motor to cause a case-shift operation by imparting a movement to the said body, a carriage, a normally inoperative-conditioned drive-train from the said motor to the said carriage, and key-means operable to effect a temporary reversal of the conditions of the said trains and a temporary energization of the motor to thereby effect a motor-driven movement of the said carriage without effecting a case-shift operation.

ALFRED G. F. KUROWSKI.

CERTIFICATE OF CORRECTION.

Patent No. 2,233,949.                                      March 4, 1941.

ALFRED G. F. KUROWSKI.

It is hereby certified that error appears in the printed specification of the above numbered patent requiring correction as follows: Page 7, second column, line 17, claim 13, for the word "of" second occurrence, read --to--; and that the said Letters Patent should be read with this correction therein that the same may conform to the record of the case in the Patent Office.

Signed and sealed this 8th day of April, A. D. 1941.

Henry Van Arsdale,
Acting Commissioner of Patents.

(Seal)